(12) United States Patent  (10) Patent No.: US 7,963,272 B2
Kleinberger (45) Date of Patent: Jun. 21, 2011

(54) SYSTEM AND METHOD FOR FUELING DIESEL ENGINES WITH VEGETABLE OIL

(76) Inventor: Oren L. Kleinberger, Talking Rock, GA (US)

( * ) Notice: Subject to any disclaimer, the term of this patent is extended or adjusted under 35 U.S.C. 154(b) by 0 days.

(21) Appl. No.: 12/693,141

(22) Filed: Jan. 25, 2010

(65) Prior Publication Data

US 2010/0122989 A1 May 20, 2010

Related U.S. Application Data

(62) Division of application No. 11/531,917, filed on Sep. 14, 2006, now Pat. No. 7,650,878.

(60) Provisional application No. 60/717,510, filed on Sep. 15, 2005.

(51) Int. Cl.
*F02M 31/12* (2006.01)

(52) U.S. Cl. ....................................................... 123/557

(58) Field of Classification Search .......... 123/543–557; 165/172, 177, 183
See application file for complete search history.

(56) References Cited

U.S. PATENT DOCUMENTS

| | | | | |
|---|---|---|---|---|
| 3,929,187 A * | 12/1975 | Hurner | ............................ | 165/52 |
| 4,015,567 A * | 4/1977 | Zabenskie | ..................... | 123/557 |
| 4,237,850 A * | 12/1980 | Connor et al. | ................ | 123/557 |
| 4,267,802 A * | 5/1981 | Garretson | ...................... | 123/523 |
| 4,343,283 A * | 8/1982 | Shepherd | ........................ | 123/557 |
| 4,387,692 A * | 6/1983 | Blackschleger | .............. | 123/557 |
| 4,476,839 A * | 10/1984 | Niblett | ........................... | 123/557 |
| 4,522,158 A | 6/1985 | Wisegerber | | |
| 4,553,697 A | 11/1985 | Nothen et al. | | |
| 4,656,979 A * | 4/1987 | Hogenson | .............. | 123/142.5 R |
| 4,684,786 A | 8/1987 | Mann et al. | | |
| 4,807,584 A * | 2/1989 | Davis | ............................ | 123/557 |
| 4,933,077 A | 6/1990 | Wolf | | |
| 4,964,376 A | 10/1990 | Veach et al. | | |
| 5,005,551 A | 4/1991 | McNelley | | |
| 5,806,502 A * | 9/1998 | Thomas et al. | ................ | 123/557 |
| 6,725,846 B2 | 4/2004 | Armstrong | | |
| 7,650,878 B2 * | 1/2010 | Kleinberger | .................. | 123/557 |
| 2001/0025631 A1 | 10/2001 | Beekman et al. | | |
| 2003/0188726 A1 | 10/2003 | Watanabe et al. | | |
| 2007/0062496 A1 | 3/2007 | Snower et al. | | |
| 2007/0283927 A1 * | 12/2007 | Fukumoto et al. | ............ | 123/445 |
| 2010/0139627 A1 * | 6/2010 | Verhein | ........................ | 123/553 |

* cited by examiner

*Primary Examiner* — M. McMahon
(74) *Attorney, Agent, or Firm* — Gardner Groff Greenwald & Villanueva, PC

(57) ABSTRACT

A heated fuel delivery system for vegetable oil or other fuels of temperature dependent viscosity, which may be used as fuel for a diesel engine. The system includes one or more heated fuel lines and/or a heated fuel tank to heat the fuel and reduce its viscosity for more efficient use. Recovered engine heat from the engine coolant system is transferred to heat the fuel.

15 Claims, 8 Drawing Sheets

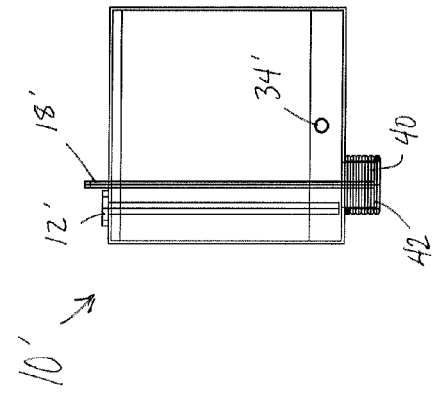
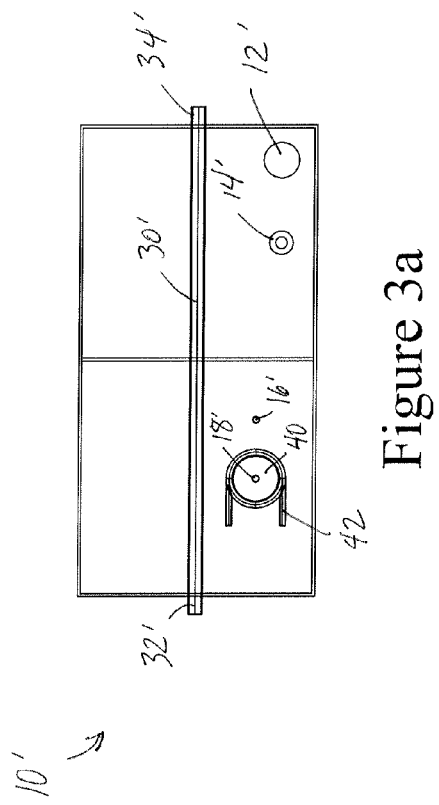
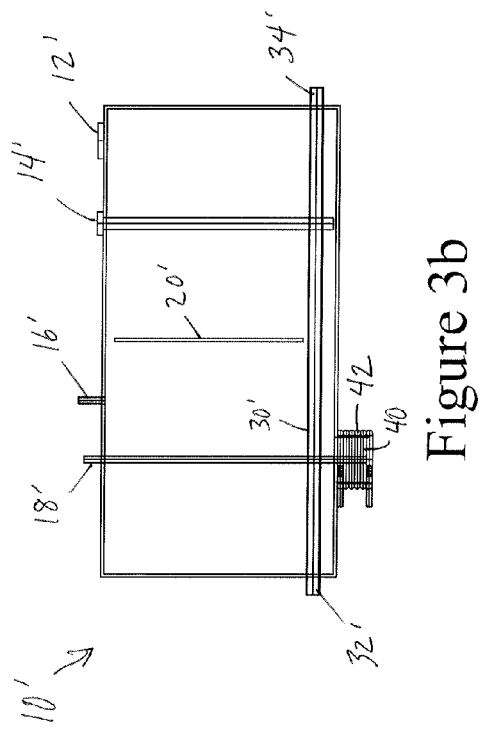

SYSTEM AND METHOD FOR FUELING DIESEL ENGINES WITH VEGETABLE OIL

CROSS-REFERENCE TO RELATED APPLICATION

This application is a divisional of U.S. Non-Provisional patent application Ser. No. 11/531,917, filed Sep. 14, 2006, which claims the benefit of U.S. Provisional Patent Application Ser. No. 60/717,510, filed Sep. 15, 2005, both of which are hereby incorporated herein by reference in their entireties for all purposes.

TECHNICAL FIELD

The present invention relates generally to an improved system, method and equipment for operating diesel engines using viscous oils as a fuel source; and more specifically to improved fuel system components that allow plant oils to run effectively in a diesel engine.

BACKGROUND OF THE INVENTION

Diesel engines are designed to run on a myriad of different fuel sources. At the Exhibition Fair in Paris, France in 1898, Rudolf Diesel demonstrated his engine running on peanut oil. Petroleum supplies were plentiful in the early to mid twentieth century, making petroleum-based fossil fuels more cost effective than vegetable oil. But more recently, the limited supply and large demand on fossil fuels have caused vegetable oil to be an economically viable option. Advantageously, vegetable oil is a renewable fuel source that can be produced domestically, and which provides superior lubrication qualities for an engine. When vegetable oil is combusted in a diesel engine, the emissions typically are dramatically decreased for nearly all areas compared to petroleum-based diesel emissions. For example, carbon dioxide is first removed from the atmosphere by plants, is stored in the vegetable oil in carbon chains, and then is returned to the atmosphere when the vegetable oil is burned in a diesel engine, resulting in zero net $CO_2$ emissions. Vegetable oil is less flammable, less toxic, and requires less energy and resources to refine than any other fuel source.

A significant difficulty often encountered with running modern diesel engines on vegetable oil, however, lies in the viscosity of vegetable oil, which is typically higher than the viscosity of petroleum-based diesel fuels. In order to run vegetable oil in a diesel engine and maintain longevity of the engine and injection pump, the vegetable oil typically must be heated before it enters the engine. This allows the oil to achieve complete combustion, reduces carbon build-up on the injectors, eases the strain on the fuel injection pump, and allows the vegetable oil to flow through the fuel filters at high flow rates. There are many methods that can be used to heat the vegetable oil. One method is through the use of electrical heating elements. This method is effective but puts additional strain on the vehicle's alternator, and also may be more prone to shortages or failure due to electrical malfunction and limited heater element life. Another method is to utilize a self-regulated system that stores engine heat and can be routed to heat the vegetable oil at safe temperatures, which is the engine coolant system. A significant drawback to this method is that it typically requires close contact between the vegetable oil and the engine coolant. There are serious deleterious effects if these systems exchange fluids, which could lead to permanent engine or injection pump failure.

Thus it can be seen that needs exist for improved systems, methods and components for utilizing vegetable oil or other materials with temperature-dependent viscosity as the fuel for a diesel engine. It is to the provision of improved systems, methods and components meeting this and other needs that the present invention is primarily directed.

SUMMARY OF THE INVENTION

The use of diesel engine vehicles fueled by waste or refined vegetable oil provides an economical and environmentally-friendly alternative for operating our country's commercial and passenger transportation needs using a renewable energy source. Although described herein primarily with reference to vegetable oil, the scope of the present invention encompasses the use of plant, animal, or fungus refined fuel sources for combustion in a diesel engine. The invention may also be utilized to burn thick-viscosity fossil fuel products or byproducts, such as for example used motor oil, as fuel sources.

The present invention provides improved systems, methods and components for utilizing vegetable oil or other materials with temperature-dependent viscosity (i.e., any material having too high a viscosity at ordinary ambient temperatures to be efficiently utilized with standard fuel systems, but having lower viscosity at elevated temperatures suitable for more efficient use as engine fuel) as the fuel for a diesel engine. Example embodiments of the invention comprise a heated fuel system, as well as individual components thereof, including a heated fuel tank, a heated fuel pick-up bowl, one or more heated fuel line segments, a fuel line flash heater, and/or a heated fuel filter. The system and components of the present invention preferably provide effective heating of vegetable oil or other fuel, through high efficiency heat exchange with hot engine coolant, in a safe and reliable manner. Alternatively or additionally, one or more fuel system components heat the fuel using electrical heating elements or other form(s) of heating.

Although a variety of system components, materials and fittings may be utilized to accomplish the task of heating vegetable oil or other temperature-dependent viscosity fuel, it has been discovered that factors including engine or vehicle vibration, as well as the effects of heat, vegetable oil, and coolant on the materials, can significantly impact performance and reliability. The system of the present invention preferably comprises one or more copper components with an option to incorporate silver sweat connections to heat the fuel lines and/or fuel tank of a vehicle. At any point where coolant and vegetable oil come in contact for heat exchange through a metal barrier, there preferably are no seams, welds, connectors, or clamps utilized. In this manner, in order for a failure caused by vegetable oil fuel mixing with coolant of the coolant system, the pipe or metal tubing carrying the fuel would have to be physically punctured, broken, or bent through protective membranes, which is much less likely than failure at a seam or connection.

Heated vegetable oil fuel lines according to example forms of the invention preferably comprise non-reactive seamless metal lines in surface contact with each other, and surrounded by an insulation layer and a protective layer. Copper tubing is preferred because of its strength and durability, but aluminum or stainless steel may also be used for line-on-line fuel line applications. This combination of materials creates a heated fuel line with an indefinite lifespan that can easily be repaired, and which is very difficult to penetrate and damage. In other example forms of the invention, a line-in-line heated fuel line is provided, preferably comprising seamless copper tubing and silver sweat connections.

Copper fuel conduits coupled with copper fittings and silver sweat connections have been found to be far superior to any other known combination of materials available for creating leak free joints. There are preferably no breaks in the fuel line when both vegetable oil and coolant are in contact with the copper tubing, and copper sweat connections are utilized both for structural integrity and at the ends as routing and connection fittings. Plastics, rubbers, and synthetic materials generally offer limited life and inferior heat exchange, and additionally typically require compression fittings and adaptors as connectors. Stainless steel is generally difficult to manipulate and typically requires welding for attachments, and also would require the use of fittings on most cases. Aluminum is a softer metal that may become brittle over time with heat and vibration, in addition to typically requiring connection or compression fittings. Accordingly, while stainless steel and aluminum conduits may be utilized for line-on-line heated fuel line designs according to the present invention, they are not preferred for any line-in-line designs because of these undesirable properties. In its various example forms, the heated plant oil fuel lines of the present invention can comprise metal pipe or tubing of varying sizes (diameter and wall thickness), preferably made of copper.

Heated fuel tanks according to example forms of the present invention preferably comprise a continuous, seamless pipe that goes directly through the tank and is welded or attached into place. In the past, designers have used a variety of methods to heat vegetable oil fuel tanks. Previously known systems, however, have included connections, bends, fittings, or welds inside the tank, and are thereby limited by the life of these welds, connections, or fittings. The fuel tank of the present invention preferably comprises one or more thick walled metal heating pipe(s) that will typically outlast the tank that they are inserted into. And if the tank ever does leak due to time or corrosion, there will still be no chance of cross-contamination of the coolant and vegetable oil systems.

An optional variation of the tank design of the present invention uses a heated fuel bowl or chamber at the fuel pick-up point. Example forms of the invention comprise a cylindrical or hemispherical metal bowl or chamber welded to the bottom of the fuel tank, which is preferably heated using a similar-metal coil wrapped around the outside of the bowl or chamber, and in surface contact therewith. Hot engine coolant flows through the coil to create a heating blanket effect on the surface of the fuel bowl. The heated fuel pick-up bowl solves two major problems. First, it allows the driver to run the fuel tank all the way to empty without allowing air into the fuel line. It also heats the oil immediately surrounding the fuel pickup, preventing gelling issues during cold weather. In alternate embodiments of the invention, the heated fuel bowl may be heated using electric or other sources of heat, rather than coolant-supplied heat, and the heated fuel bowl may be formed in a variety of shapes and sizes.

In one aspect, the invention is a fuel system for delivering fuel of temperature-dependent viscosity. The fuel system preferably includes a fuel tank having at least one heated portion, and a heated fuel line assembly transferring fuel from the fuel tank.

In another aspect, the invention is a heated tank for containing a volume of fuel having a temperature-dependent viscosity. The heated tank preferably includes a container housing, and means for heating at least a portion of the volume of fuel.

And in another aspect, the invention is a heated fuel line system for heating and delivering a fuel of temperature-dependent viscosity to a diesel engine. The heated fuel line system preferably includes at least one fuel line defining a fuel conduit for delivery of fuel therethrough. The heated fuel line system preferably also includes at least one coolant line defining a coolant conduit for delivering heated engine coolant therethrough. Preferably, at least one fuel line is in thermal contact with the heated engine coolant for effecting transfer of heat from the coolant to heat the fuel.

In another aspect, the invention is a fuel heating system including an unheated storage tank, and a heating tank. The heating tank preferably has an inlet receiving unheated fuel from the unheated storage tank, an outlet discharging heated fuel to the intake of an engine's fuel filter and injection pump system, and a heating element for heating fuel contained within the heating tank.

These and other aspects, features and advantages of the invention will be understood with reference to the drawing figures and detailed description herein, and will be realized by means of the various elements and combinations particularly pointed out in the appended claims. It is to be understood that both the foregoing general description and the following brief description of the drawings and detailed description of the invention are exemplary and explanatory of preferred embodiments of the invention, and are not restrictive of the invention, as claimed.

BRIEF DESCRIPTION OF THE DRAWINGS

FIGS. 3a-3c show cross-sectional views of the heated fuel tank of FIG. 2.

DETAILED DESCRIPTION OF EXAMPLE EMBODIMENTS

Figure 1B:
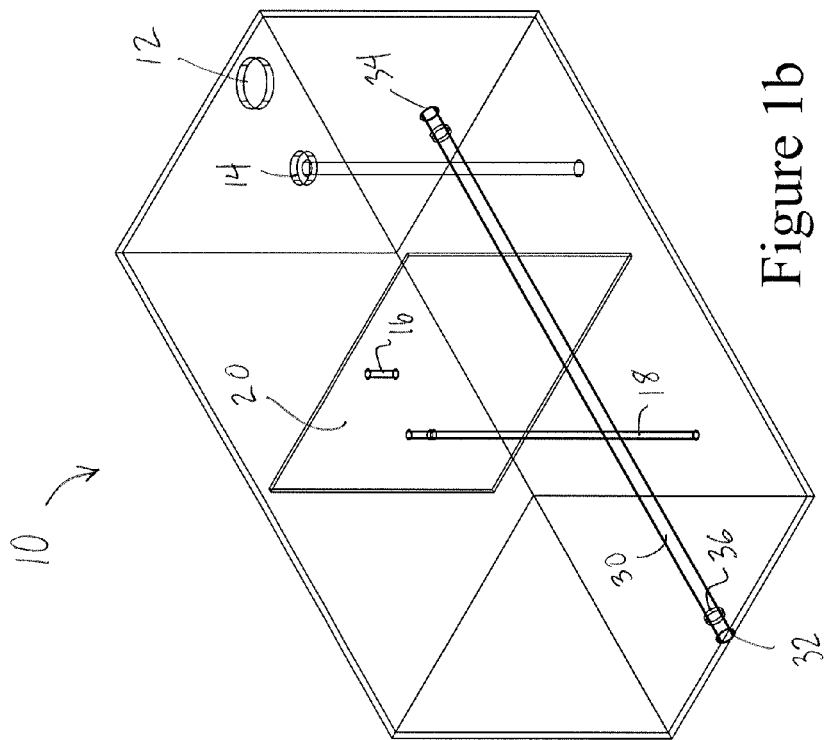
FIGS. 1a and 1b show external and internal views, respectively, of a heated fuel tank according to an example embodiment of the invention.

The present invention may be understood more readily by reference to the following detailed description of the invention taken in connection with the accompanying drawing figures, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention. Also, as used in the specification including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

The present invention provides a fuel heating system and various components thereof for safely and effectively heating vegetable oils and other fuels having temperature-dependent viscosity, utilizing heat transferred from the engine coolant. In example forms, the system safely and rapidly heats the fuel oils to temperatures greater than 140° F. and less than 200° F. Referring to the drawing figures, the invention will be described in example forms, as a system that prepares and processes viscous oil fuel sources prior to the oil's injection into a diesel engine. The diesel engine can be used, for example, to drive a vehicle, a power generator, a pump, and/or for various other applications. Vegetable oil is presently considered to be the most common fuel that will be used in connection with the present invention, and is therefore referred to in the example embodiments described herein. It will be understood by those of skill in the art, however, that the present invention is also suitable for use in connection with various other temperature-dependent viscous fuels. In its various forms, the present invention comprises a heated fuel tank, a heated fuel line, a heated fuel pick-up chamber, a fuel line flash-heater, or a heated fuel filter, as described in greater detail herein; and further comprises a fuel system for delivering a temperature-dependent viscosity fuel to an engine, said system comprising one or more of these components, alone or in any combination thereof.

Figure 1A:
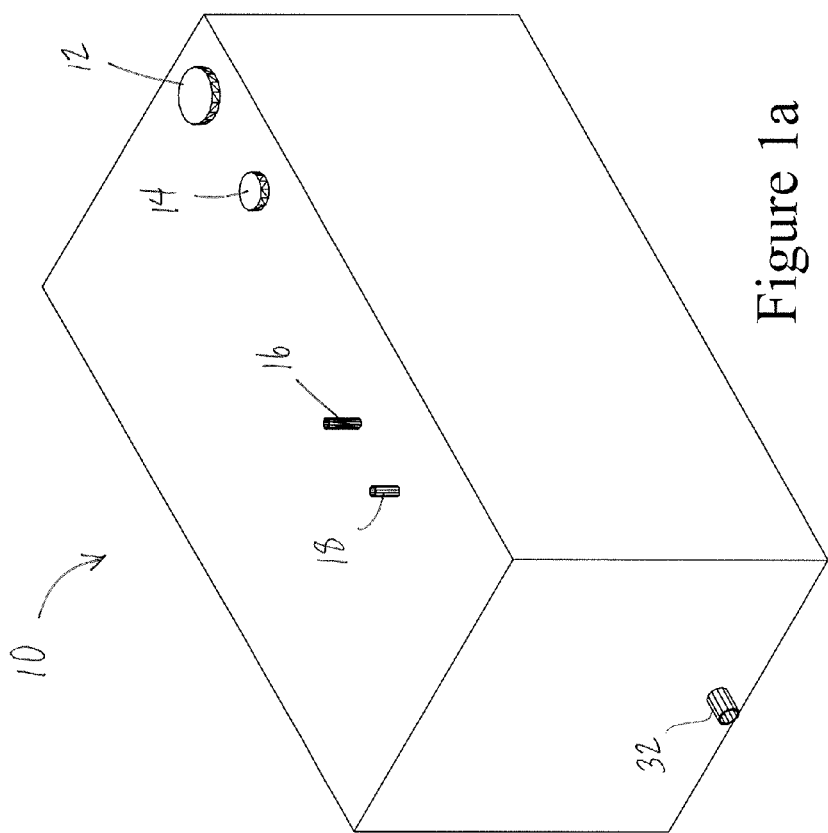

Referring to FIG. 1, vegetable oil or other temperature-dependent viscosity fuel is preferably stored in a heated fuel tank 10, separate from a tank (unshown) of standard diesel fuel that may optionally be provided, mounted to or adjacent an associated vehicle, power generator, or other diesel engine-driven implement. The heated fuel tank 10 preferably comprises a hollow container constructed of either stainless steel, mild steel, or aluminum, and preferably having a fill opening 12, a level sender 14, a vent 16, a fuel pick-up line 18, and one or more baffles 20 within the container. The material thickness may vary, but typically a minimum of 16-gauge mild steel or 18-gauge stainless steel is preferred. A thermally conductive conduit or heating pipe 30 preferably extends through the tank, with an inlet 32 for receiving hot coolant fluid from the engine on one side of the tank, and an outlet 34 on the opposite side of the tank for discharging the coolant back to the engine cooling system. The heating pipe 30 is preferably made of similar metals to the tank 10 so that it can be seam welded to the tank. During the manufacturing or retrofitting of the tank 10, two holes are drilled on either side of the tank and holes are cut in the tank baffles 20 if any exist. The size of the holes is preferably minutely larger than the pipe 30 passing through the tank 10 and they are drilled accordingly so that the pipe 30 can be slid into position and the seam between the pipe and the tank can easily be welded. This weld 36 only affects the surface of the very thick and robust pipe 30, but creates a seam with the tank to leak seal the tank. The pipe 30 can be threaded at both ends for the attachment of nipples or other connections for heater hose attachment, for example using hose clamps. In an alternative embodiment, the pipe 30 is unthreaded and ½" heater hose or larger is attached over the pipe with a sealant and hose clamp. The pipe 30 is preferably a seamless extruded pipe, and preferably has no connections, bends, fittings, or welds inside the tank 10, thereby minimizing the potential for any leaks and possible cross-contamination between the fuel contained in the tank and the heated coolant fluid passing through the pipe. The tank design of the present invention preferably can be retrofitted to virtually any preexisting standard or custom tank design, to convert it into a heated tank with minimal potential for contamination between fuel and engine coolant.

Figure 2B:
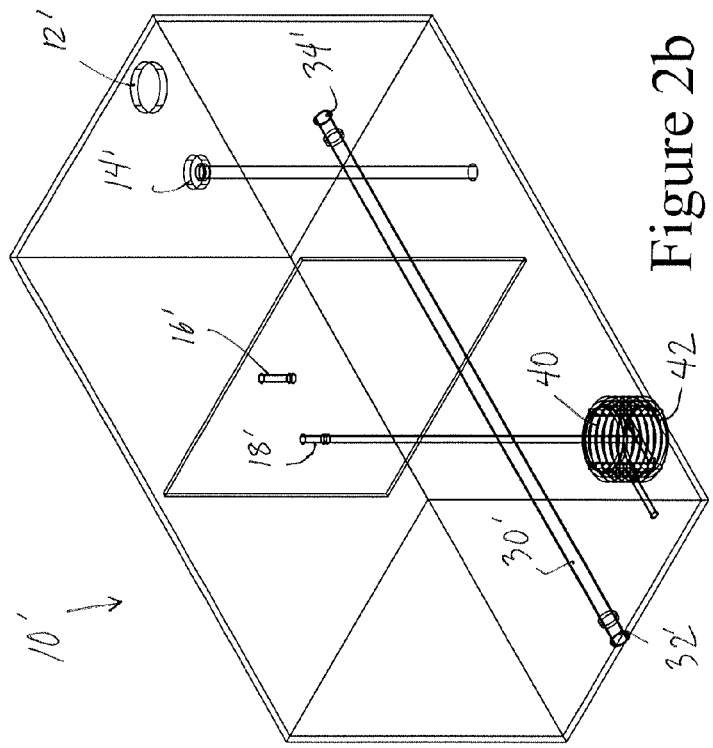
FIGS. 2a and 2b show external and internal views, respectively, of a heated fuel tank, including a heated fuel pick-up chamber, according to another example embodiment of the invention.
Figure 2A:
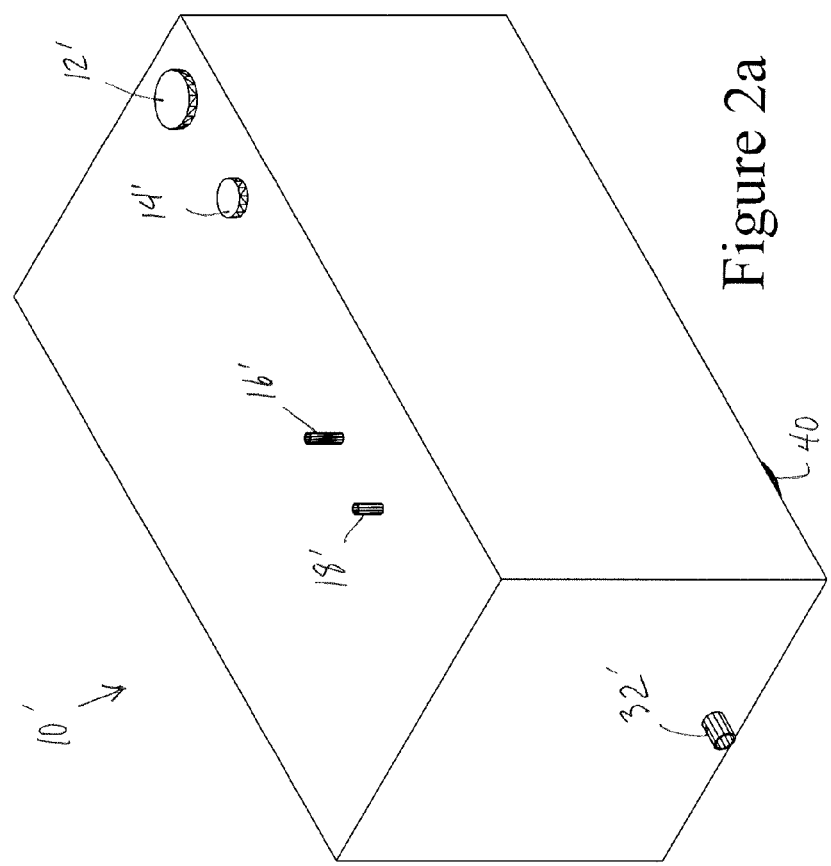

With reference to FIGS. 2 and 3, alternate forms of the fuel tank 10' of the present invention optionally further comprise a heated fuel pick-up chamber 40 at the bottom of the tank. The heated fuel pick-up chamber 40 can be utilized instead of, or in addition to, the heating pipe 30. The heated fuel pick-up chamber 40 preferably comprises a piece of pipe of between about 2-10" in diameter and between about 2-6" in height, (optionally larger for industrial applications, or smaller for lower fuel consumption systems). A plate is continuously welded to the bottom of the pipe to provide a sealed enclosure, and a hole is cut in the tank 10' where the pipe is welded to provide fluid communication from the tank into the chamber 40. In this manner, the chamber 40 forms a relatively small portion of the overall contained volume of the tank 10', preferably having a cylindrical shape that is open to the tank's interior at its top, and that is closed at its bottom. Alternatively, a hemispherical bowl-shaped pick-up chamber is provided at the bottom of the tank 10'. A thermally conductive coil 42, preferably formed of copper, stainless steel, aluminum or other metal, preferably wraps helically and substantially continuously around the outer surface of the chamber 40, delivering hot coolant from the engine to heat the fuel contained in the pick-up chamber. Alternatively or additionally, an electric heating element or other heating means are provided to heat the fuel in the chamber 40. The chamber 40 and coil 42 are preferably composed of metals compatible with the tank. There is no chance of coolant fluid cross-contamination with the fuel contained in the heated fuel chamber 40 because the coil 42 applies heat to the chamber externally rather than internally. The fuel pick-up line 18 extends within the contained volume of the heated fuel chamber 40, and draws fuel heated by the chamber for delivery to the engine intake. The provision of the heated fuel chamber 40 provides a number of advantages, including faster heating due to its relatively small contained volume, and the ability to use virtually all of the fuel in the tank because it extends below the bottom of the tank (i.e., no "dead-space" at the bottom of the tank).

Figure 4:
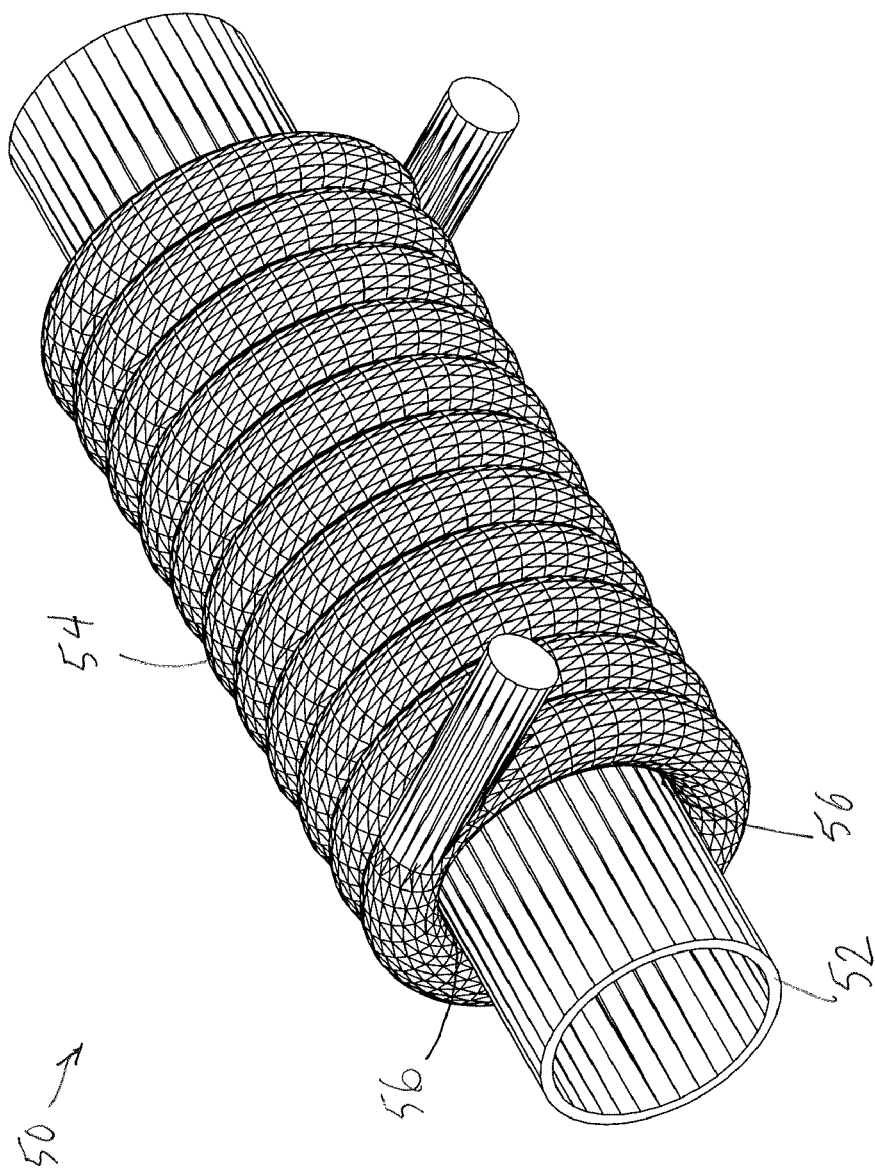
FIG. 4 shows a line-on-line type heated fuel line according to an example embodiment of the invention.

FIG. 4 shows an example embodiment of a heated fuel line assembly 50 according to the present invention. This form of heated fuel line 50 may be termed a "line-on-line" heat exchange fuel line, a "secondary" or a "final" heated fuel line, or a "flash heater". In example forms of the fuel system of the present invention, this form of heated fuel line 50 may be positioned after the heated fuel tank and heated fuel filter, and before the injection pump of the fuel system, to quickly heat the fuel immediately prior to delivery to the engine intake. Heated engine coolant fluid preferably flows through the inner conduit of a thermally conductive coolant tube 52, which is preferably formed of copper, aluminum, steel or other metal. This coolant tube 52 is typically of about ¾"-1" diameter, but may vary depending on the application. Wrapping helically and preferably substantially continuously around at least a portion of the length of the coolant tube 52 are one or more smaller thermally conductive conduits 54 that comprise the heated vegetable oil fuel line(s). The smaller lines 54 are preferably formed of the same or compatible material as the coolant tube 52, and are optionally sweat-welded 56 to the coolant tube, for example using silver solder, to create optimal heat transfer and added stability. The ends of both the large inner pipe and the smaller outer line(s) are preferably connected to the cooling and fuel systems, respectively, using heater or fuel hose, sealant, and hose clamps. The outside is preferably insulated over the smaller lines, and optionally clad with a protective layer. In an alternate form, this type of heated fuel line can operate with the heated coolant flowing through the outer coiled conduit 54, and with the fuel flowing through the inner conduit 52, whereby, the heated coolant in the coil applies heat externally to the heated fuel line creating a heating blanket effect.

Figure 5B:
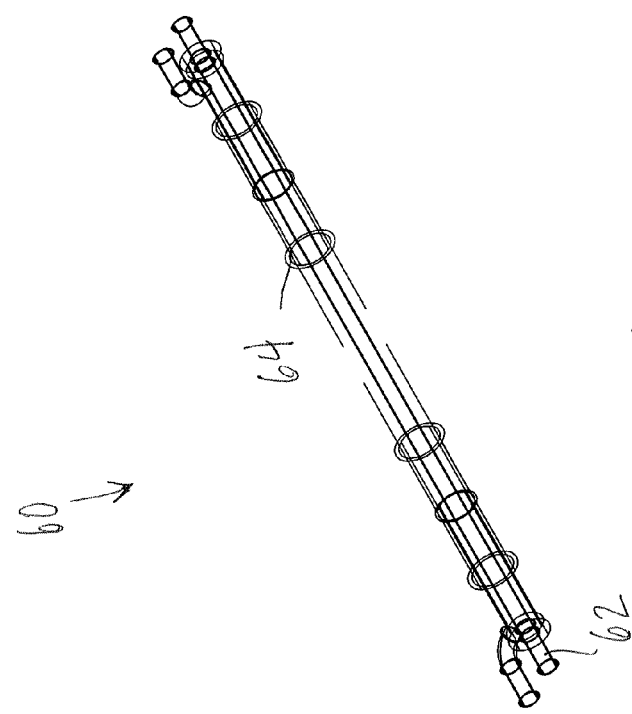
FIG. 5 shows a line-in-line type heated fuel line according to an example embodiment of the invention.
Figure 5A:
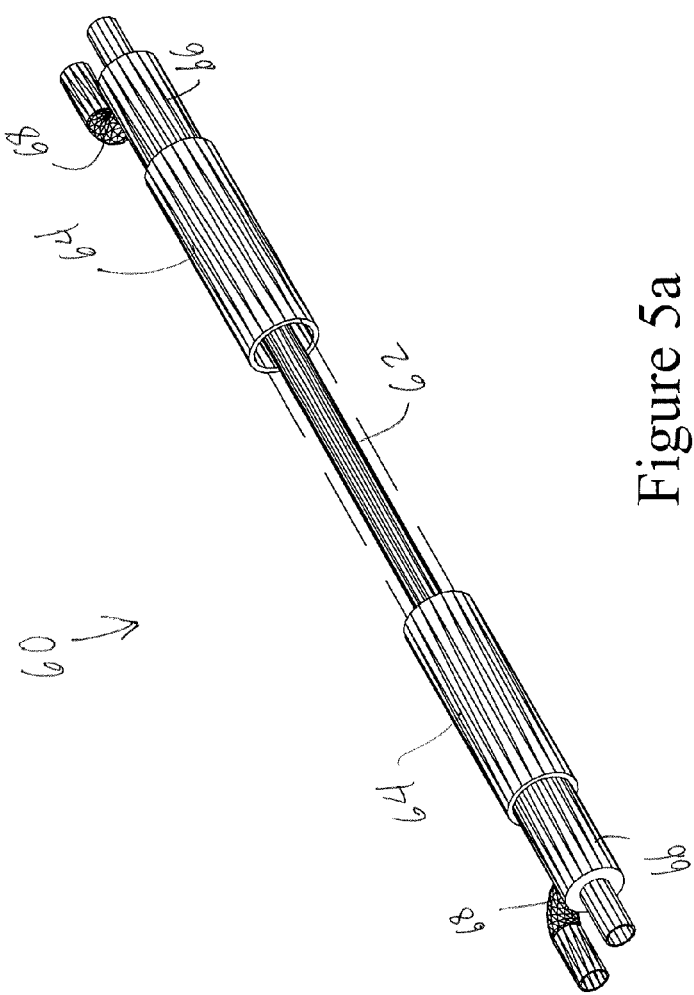

FIG. 5 shows another form of heated fuel line assembly 60 according to the present invention, termed a "line-in-line" heat exchange fuel line. A thermally-conductive inner fuel line 62 extends through an outer coolant line 64. The inner fuel line 62 is preferably a continuous, unitary length of tubing from end to end, with no connections, seams or breaks that might allow leakage and cross-contamination. The inner fuel line 62 is preferably ½ inch copper type L refrigerator tubing, or other copper, aluminum or steel tubing. The outer coolant line 64 is preferably a 1" diameter heater hose 28. On the outside of the inner fuel line 62, hot engine coolant is flowing through the interior conduit of the outer coolant line 64, directly heating up the inner fuel line and the vegetable oil transported through its inner conduit. This coolant is preferably bound by the outer coolant line 64 for substantially the entire length of the fuel line. At the ends of the heated fuel line, copper sweat connections are preferably used to route the coolant from the coolant system into the heating system. All sweat connections are preferably made using either 5% or 15% silver soldier. At each end, the outer coolant line 64 is preferably attached to a section of ¾" copper tubing 66 and then a reducing tee 68, and one or more reducing fittings may be used to attach to the fuel line 62. The sweat connections are preferably used to attach to the copper heated fuel line in order to route the coolant and attach the heater pipe. The coolant flows into and out of the system at couplings at either end, preferably comprising hose clamps, sealant, and ½ inch heater hose. In order to optimize heat exchange, the direction of coolant flow is preferably the opposite of the direction of the fuel flow (e.g., counter-flow heat exchange).

Figure 6:
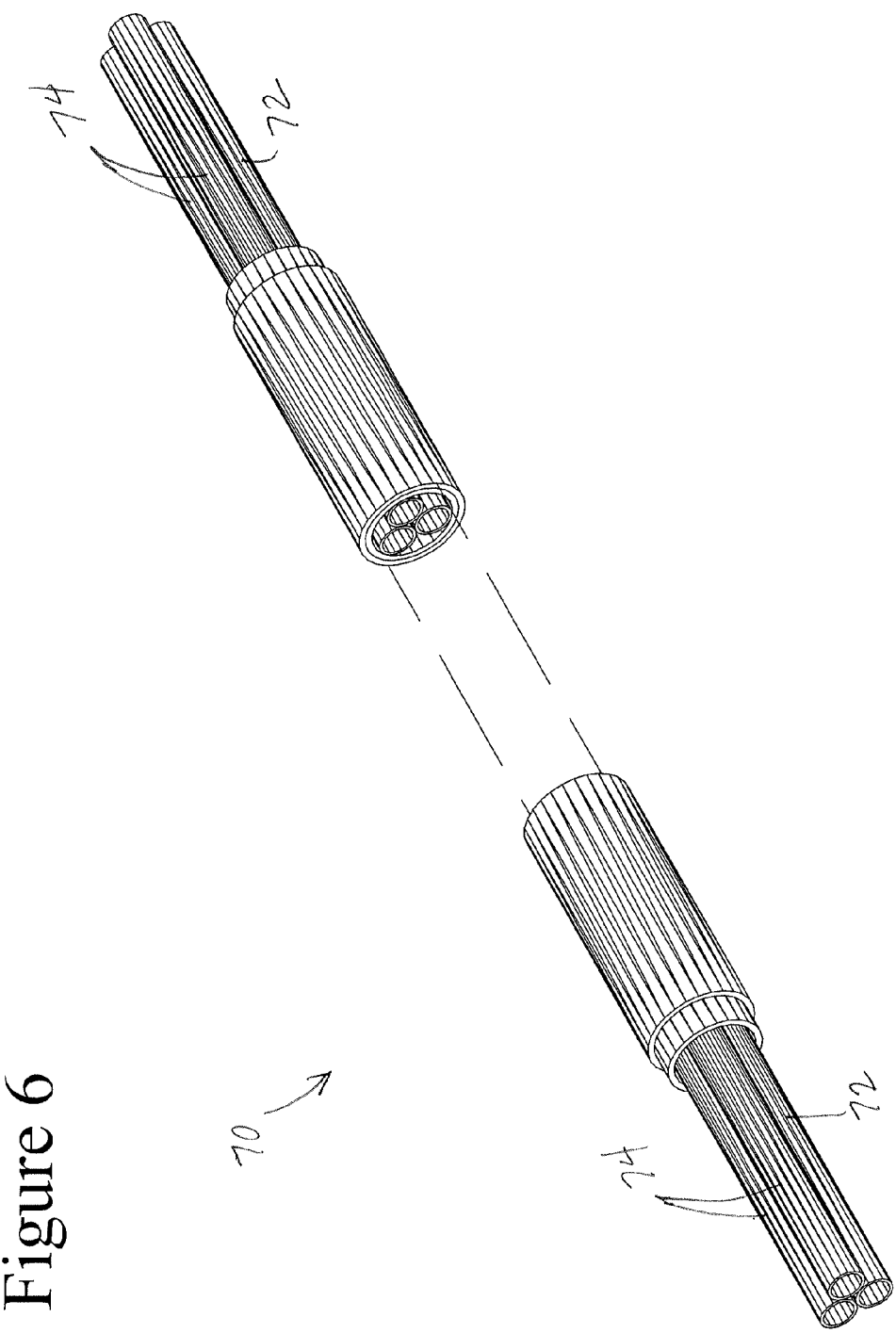
FIG. 6 shows a line-on-line type heated fuel line according to another example embodiment of the invention.

FIG. 6 shows another form of "line-on-line" heat exchange fuel line assembly 70 according to the present invention. Example forms of the heated fuel line 70 may be utilized as a "primary" or "initial" heated fuel line component of the overall fuel delivery system of the present invention, for delivery of fuel from the tank to the switching valves and filters of the engine. At least one thermally-conductive fuel conduit 72 is arranged in thermally-conductive contact with or closely adjacent to at least one coolant line 74, whereby heat from the heated engine coolant traveling through the coolant line is transferred to the fuel traveling through the fuel conduit. The lines 72, 74 are optionally coiled or twisted together with one another to increase surface area of contact per unit length, for improved heat transfer to the fuel. In the depicted embodiment, three copper lines are utilized, two coolant lines 74 and one fuel conduit 72. Optionally, one of the coolant lines 12 delivers hot coolant from the engine cooling system to the heated fuel tank, and the other coolant line returns hot coolant from the heated fuel tank to the engine cooling system. A layer of pipe insulation 76 is preferably provided around the outside of the lines 72, 74, then a protective sheath 78, for example formed of heater hose cut in half lengthwise, is mounted over the insulated assembly using plastic pull-ties or other attachment means.

Figure 7:
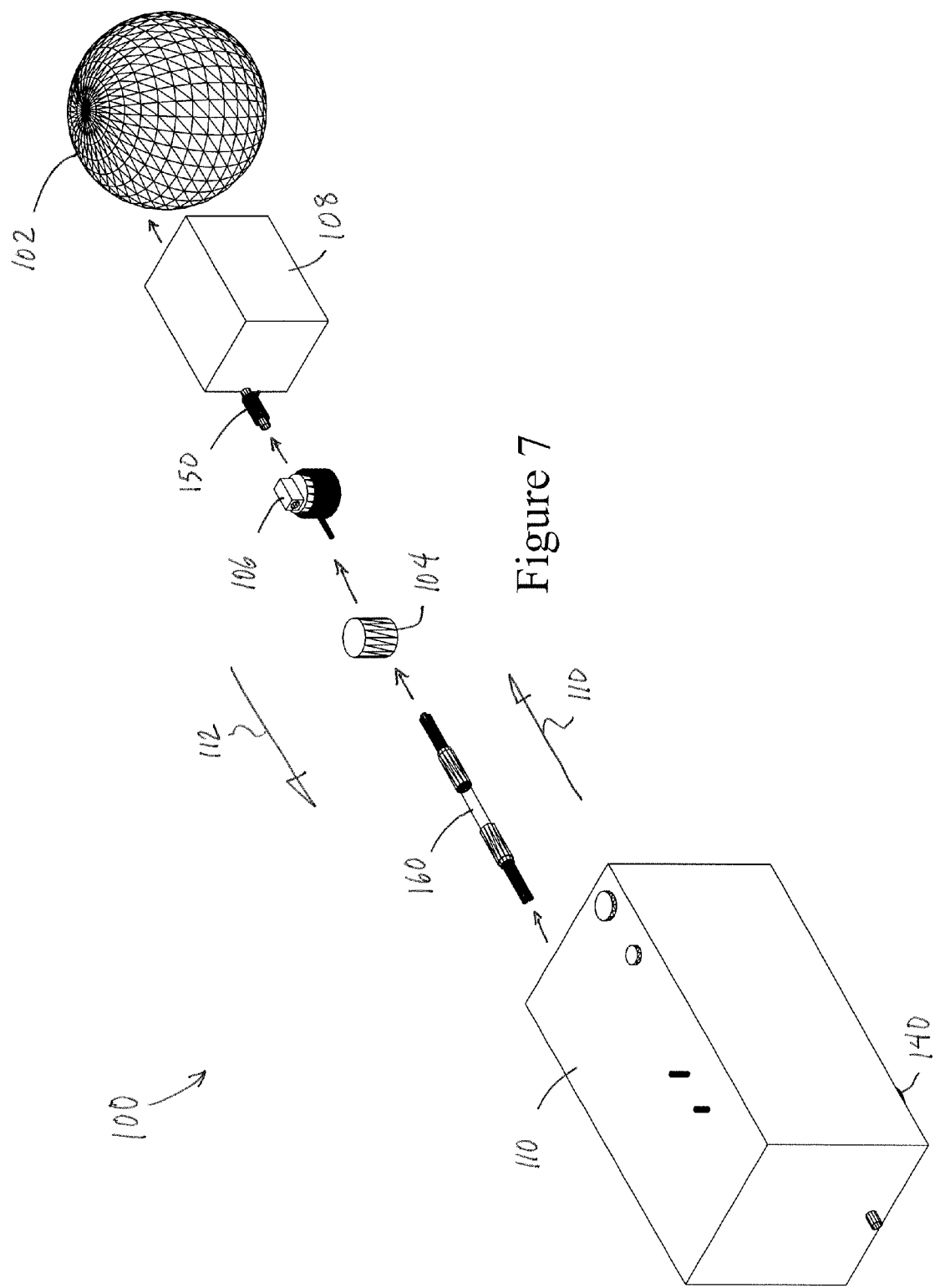
FIG. 7 is a fuel flow diagram showing a fuel delivery system according to an example embodiment of the invention.

FIG. 7 shows an example fuel heating system 100 according to the present invention in schematic form. The system and components of the present invention heat a temperature-dependent viscosity fuel such as vegetable oil, to reduce its viscosity and thereby facilitate efficient delivery and combustion in an engine 102, for example a diesel engine. Some or all of the heat used to heat the fuel is preferably recovered from the coolant used to cool the engine being fueled by the heated fuel. The fuel is preferably pumped or otherwise delivered from a heated fuel tank 110 and/or heated fuel pick-up chamber 140 of a fuel tank via a heated fuel line 160, by a heated lift pump 104. Optionally, valving (unshown) in the fuel lines or other components permits switching between alternate fuel sources, for example for warm-up or fuel reserve purposes. The fuel is preferably pumped through a heated fuel filter 106, into a flash-heater 150 and through an injection pump 108, into the fuel intake of the engine 102. The heated fuel filter 106 can be made of many different variations or designs and preferably filters to 10 microns or finer. Fuel flows through the system 100 in the direction of arrow 110; and heated coolant used to heat the fuel in the various components of the system preferably flows through the system in the direction of arrow 112, or alternatively in the opposite direction. The system of the present invention preferably comprises a two-tank fuel system, whereby the engine starts on standard diesel or biodiesel fuel delivered from an unheated tank. Once the engine is up to running temperature and the coolant system and vegetable oil fuel system have been allowed to heat up, then motorized solenoid valves are preferably actuated to switch fuel sources to pure heated pre-filtered vegetable oil. Before the engine is shut down, the vegetable oil is preferably flushed out of the engine by switching back to the standard fuel tank, so that diesel or biodiesel can be used for starting the cold engine.

Figure 8:
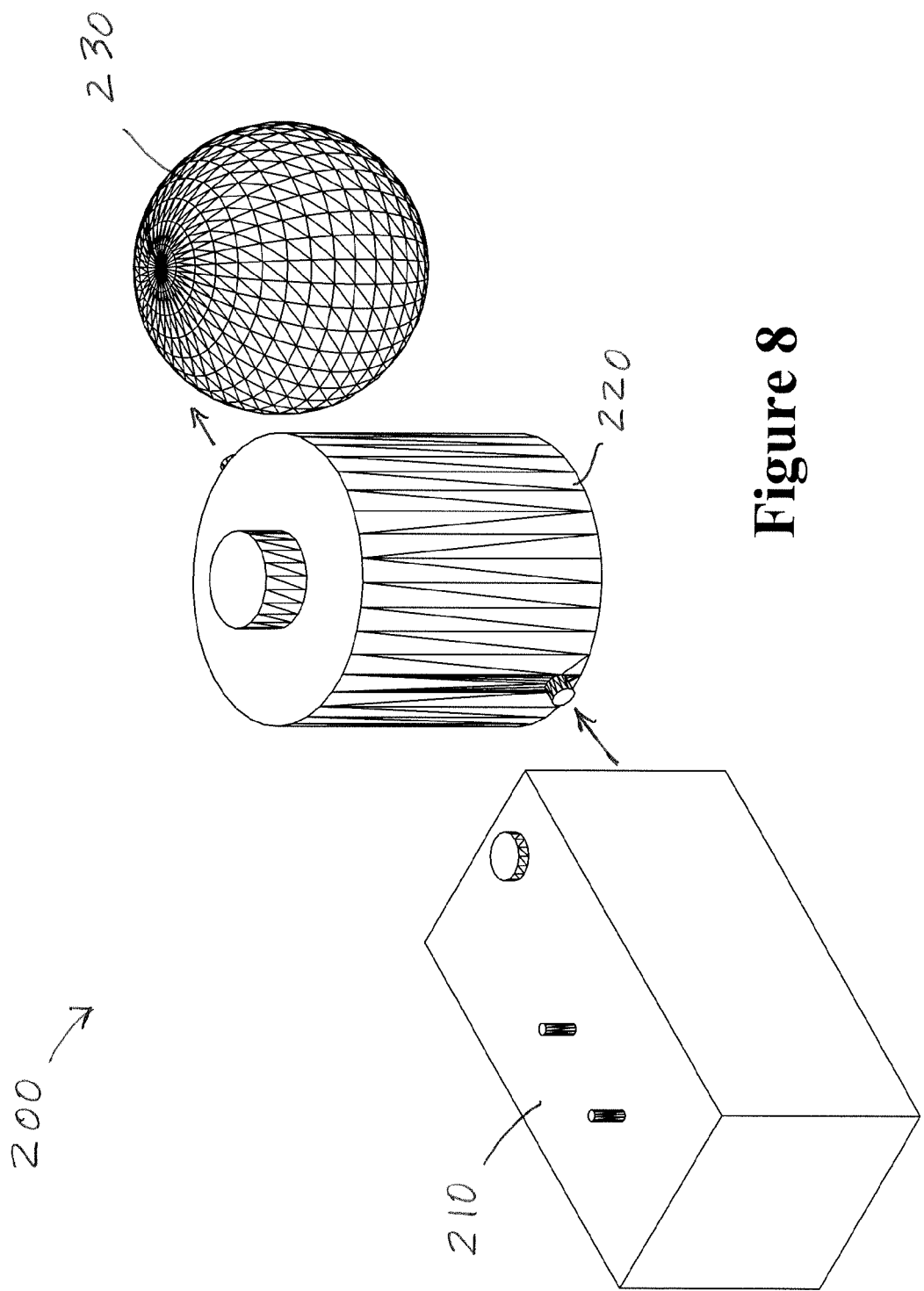
FIG. 8 shows a fuel delivery system according to another embodiment of the invention, incorporating an in-line fuel heater.

FIG. 8 shows a fuel heating system 200 in schematic form, according to another example form of the present invention. Temperature-dependent viscosity fuel from an unheated source such as a storage tank 210 is gravity fed or pumped to an in-line heating tank 220, and from the in-line heating tank to the intake of an engine 230. In a stationary system such as, for example, the fuel system of a diesel engine-driven electric power generator for a building, the in-line heating tank 220 may, for example, comprise a small (e.g., 1 to 3 gallon) thermostatically-controlled and self-regulating insulated electric hot water heater connected to a 120 volt or 240 volt source. For a non-stationary system such as a diesel engine-driven vehicle, the in-line heating tank 220 may heat the fuel using gas or propane, using heat recovered from the engine coolant system, or using the vehicle's 12 volt electrical system. Temperature-dependent viscosity fuel can be pre-heated in the in-line heating tank 220 prior to starting the engine 230, and/or valving can be provided to switch between standard diesel fuel delivered from a separate source (unshown) for start-up, and then manually or automatically switched over to vegetable oil or other temperature-dependent viscosity fuel from the in-line heating tank 220 when the engine and/or fuel reach a desired temperature. The in-line heating tank 220 preferably heats contained fuel to a regulated temperature of between 140° F. to 200° F., for example using an electronic thermostat, and preferably includes an emergency shut-off to prevent overheating. Fuel is preferably drawn from a discharge line at or near the top of the in-line heating tank 220, to prevent running out of fuel and causing a fire hazard.

While the invention has been described with reference to preferred and example embodiments, it will be understood by those skilled in the art that a variety of modifications, additions and deletions are within the scope of the invention, as defined by the following claims.

What is claimed is:

1. A fuel system for delivering fuel of temperature-dependent viscosity, said fuel system comprising:

a fuel tank having at least one heated portion; and a heated fuel line assembly transferring fuel from the fuel tank;

wherein the heated fuel line assembly comprises first and second coolant fluid conduits, each in thermally conductive contact with a fuel conduit, wherein the first coolant fluid conduit delivers a heated engine coolant to the heated portion of the fuel tank, and wherein the second coolant fluid conduit returns the heated engine coolant from the heated portion of the fuel tank.

2. The fuel system of claim 1, wherein the heated portion of the fuel tank comprises a heating pipe extending through a contained volume of the fuel tank.

3. The fuel system of claim 2, wherein the heating pipe is free of any connections, bends, fittings, and welds inside the contained volume of the fuel tank.

4. The fuel system of claim 2, wherein the fuel tank and the heating pipe comprise aluminum.

5. The fuel system of claim 1, wherein the heated fuel line assembly comprises a line-on-line heat exchange fuel line assembly.

6. The fuel system of claim 1, wherein the heated fuel line assembly comprises a line-in-line heat exchange fuel line assembly.

7. The fuel system of claim 1, wherein the fuel conduit comprises a thermally conductive material selected from copper, aluminum and steel.

8. The fuel system of claim 1, wherein the at least one heated portion of the fuel tank comprises a heated fuel pick-up chamber portion of the fuel tank.

9. The fuel system of claim 1, wherein the at least one heated portion of the fuel tank comprises a thermally conductive heating pipe extending through the fuel tank.

10. The fuel system of claim 1, wherein the fuel conduit comprises a continuous unitary length of tubing, without any seams, discontinuities or connections.

11. A heated fuel line system for heating and delivering a fuel of temperature-dependent viscosity to a diesel engine, said heated fuel line system comprising at least one fuel line defining a fuel conduit for delivery of fuel therethrough, and at least one coolant line defining a coolant conduit for delivering coolant therethrough, said at least one fuel line being in thermal contact with said coolant for effecting transfer of heat from said coolant to heat said fuel, wherein an exterior surface of the at least one fuel line is in contact with an exterior surface of the at least one coolant line, and wherein the at least one coolant line comprises a first coolant line delivering fuel in a first direction, and a second coolant line delivering fuel in a second direction generally opposite the first direction.

12. The heated fuel line system of claim 11, wherein the at least one fuel line and the at least one coolant line are twisted around one another.

13. The heated fuel line system of claim 11, wherein the at least one coolant line comprises a relatively large diameter length of tubing, and wherein the at least one fuel line comprises a relatively small diameter length of tubing coiled around said coolant line.

14. The heated fuel line system of claim 11, wherein the at least one fuel line comprises a continuous unitary length of copper tubing, without any seams, discontinuities or connections where it is in thermal contact with said coolant.

15. The heated fuel line system of claim 11, wherein the at least one fuel line comprises a thermally conductive material selected from copper, aluminum and steel.

\* \* \* \* \*